United States Patent [19]

Zalesak et al.

[11] 4,223,400

[45] Sep. 16, 1980

[54] LOW-FREQUENCY DIRECTIONAL HYDROPHONE

[75] Inventors: Joseph F. Zalesak, Altomonte Springs; A. Zed Robinson, Winter Park, both of Fla.

[73] Assignee: The United States of America as represented by the Secretary of the Navy, Washington, D.C.

[21] Appl. No.: 946,679

[22] Filed: Sep. 28, 1978

[51] Int. Cl.³ ............................................. G01S 3/80
[52] U.S. Cl. ................................... 367/135; 367/126
[58] Field of Search ...................... 367/126, 129, 135

[56] References Cited

U.S. PATENT DOCUMENTS 2,396,222  3/1946  Foldy ............................. 367/126

*Primary Examiner*—Richard A. Farley
*Attorney, Agent, or Firm*—R. S. Sciascia; Philip Schneider

[57] ABSTRACT

A directional hydrophone and electronic circuit combination giving a ($\cos^2\theta$) directivity pattern. A monopole transducer is placed coaxially within a ring transducer and the ring output is fed to a function-conversion electronic circuit which provides a ($\sin^2\theta$) output signal. This signal and the output signal of the monopole are fed to a weighted differential amplifier where they are subtracted. The output of the amplifier is a ($\cos^2\theta$) signal. By utilizing different components in the function-conversion circuit, the device can be made narrowband or broadband.

7 Claims, 7 Drawing Figures

LOW-FREQUENCY DIRECTIONAL HYDROPHONE

BACKGROUND OF THE INVENTION

This invention relates to directional hydrophones and especially to a transducer/circuit combination which provides a ($\cos^2 \theta$) output over a broad frequency band.

A free-flooded, circumferentially polarized ring transducer can be used to generate a ($\cos^2 \theta$) directivity pattern. However, this transducer operates only over a limited band of frequencies. Also, to make a circumferentially polarized ring, the ring must either be segmented or have stripe electrodes on the inner and outer surfaces. In practice, good nulls at $\theta = 90°$ are not obtained with a circumferentially polarized ring transducer. The nulls at 90° are only 10 or 15 dB below the response at 0°. A ring transducer which could provide well-defined nulls and broadband response would be desirable.

SUMMARY OF THE INVENTION

The present invention comprises a combination consisting of a monopole/ring transducer and a circuit for combining the outputs of the monopole and ring to provide a ($\cos^2 \theta$) output, with good nulls. In its broad aspect, the output of the ring transducer is fed to a function-conversion electronic circuit which provides an output proportional to $\sin^2 \theta$. The outputs of the function converter and the monopole are subtracted in a weighted differential amplifier to provide a final output signal which is proportional to $\cos^2 \theta$. The ensemble (ring, monopole and circuit components) performs as a low-frequency, narrowband hydrophone when a variable-gain amplifier is used as the function-converter.

By substituting a weighted differential amplifier in series with a pair of integrators for the variable-gain amplifier of the first ensemble, a second ensemble is provided which performs as a low-frequency, broadband hydrophone with a ($\cos^2 \theta$) directivity pattern.

DETAILED DESCRIPTION OF THE INVENTION

Figure 1:
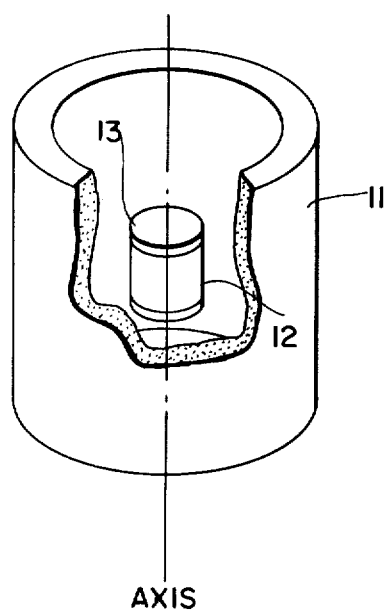
FIG. 1 is an isometric view of the ring/monopole transducer in which the ring is partially broken away to show the monopole.

FIG. 1 shows, in isometric view, the ring/monopole transducer of the present invention. The ring 11 is an open-ended tube of arbitrary polarization. The monopole 12 is a tube which is capped (13) at both ends. The tubes are preferably coaxial, although they may merely be placed in close proximity to each other.

To obtain the patterns and gain curves shown herein, a typical transducer was constructed using a ring 11 which was 1" long, $\frac{1}{8}$" thick, and had a 1" outer diameter. The monopole was $\frac{1}{4}$" long, 1/32" thick, and had a $\frac{1}{4}$" outer diameter. Both tubes were made from piezoceramic materials, the ring from PZT-5H and the monopole from PZT-5A. Both tubes were radially polarized.

Figure 2:
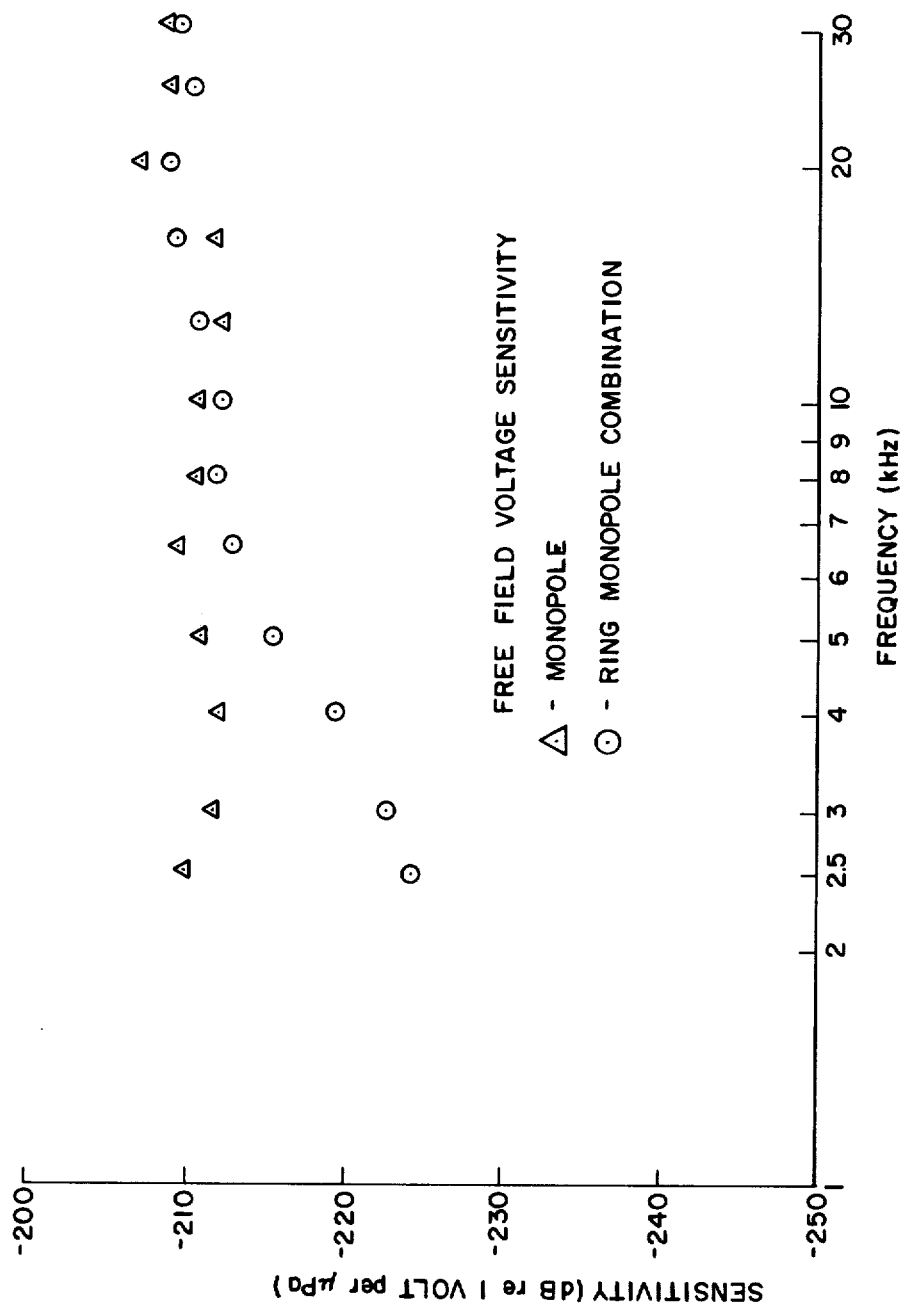
FIG. 2 is a graph of sensitivity vs. frequency for the monopole transducer and for the ring/monopole (R/M) transducer functioning in the ensemble shown.

FIG. 2 shows the sensitivity in the indicated ensemble of the monopole transducer alone (triangles) and of the ring/monopole combination (circles) along the axis. Theory predicts that, at high frequencies, the combination should have the same sensitivity to acoustic waves as the monopole transducer and, at low frequencies, the sensitivity of the combination should fall below that of the monopole by 12 dB per octave.

Figure 3:
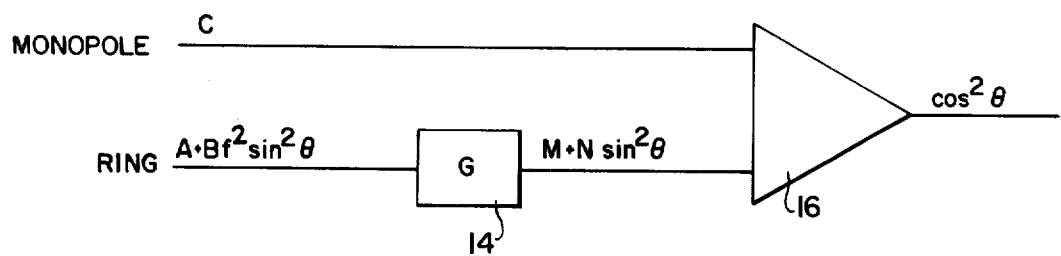
FIG. 3 is a block diagram of a circuit for use with the ring/monopole transducer.
Figure 4:
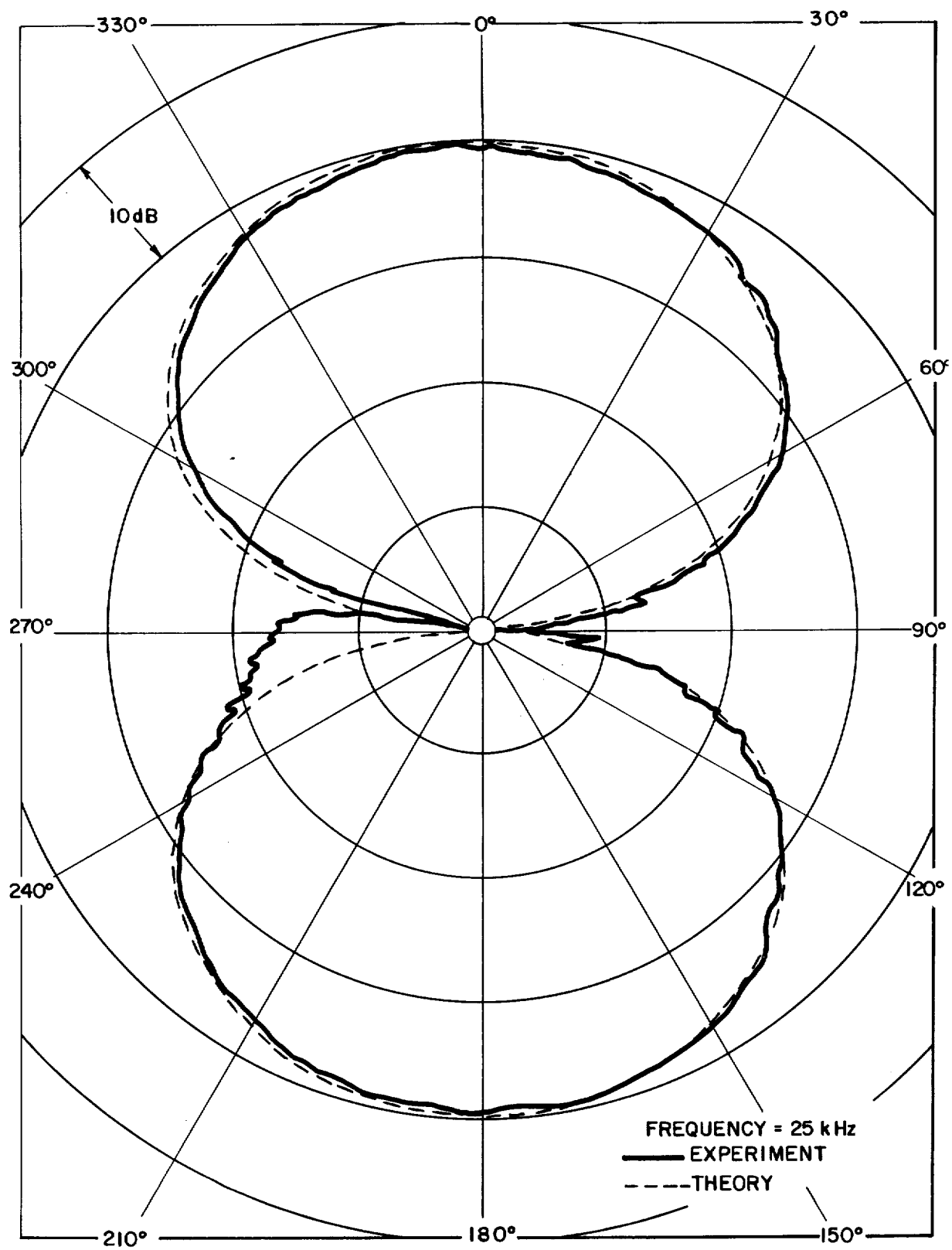
FIG. 4 is a directivity pattern in terms of angle $\theta$ for the ensemble consisting of the R/M combination transducer and the circuit shown in FIG. 3.

FIG. 3 shows a circuit that is employed with the R/M combination to give a ($\cos^2 \theta$) output, where $\theta$ is the angle between the axis of the combination and the direction of incidence of a sound wave. If the output of the ring is fed to a variable-gain amplifier 14 to be amplified by a factor G and the amplified output is then combined in amplifier 16 with the output of the monopole, then at some frequency the combination is sensitive to sound incident in the axial direction and insensitive to sound incident in the radial direction. In particular, the sensitivity to sound is proportional to $\cos^2 \theta$. If the monopole has a sensitivity which is independent of frequency, then theory predicts that the gain G should be given by the expression $$G = 1/(A + Bf^2) \qquad (1)$$

where A and B are constants and f is the frequency of operation for which a ($\cos^2 \theta$) directivity pattern is desired. FIG. 4 shows a measured directivity pattern for the combination (solid line) and a theoretical ($\cos^2 \theta$) pattern at 25 kHz. Patterns close to the theoretical ($\cos^2 \theta$) pattern are obtainable in a frequency range covering from about 2.5 kHz to about 30 kHz.

Figure 5:
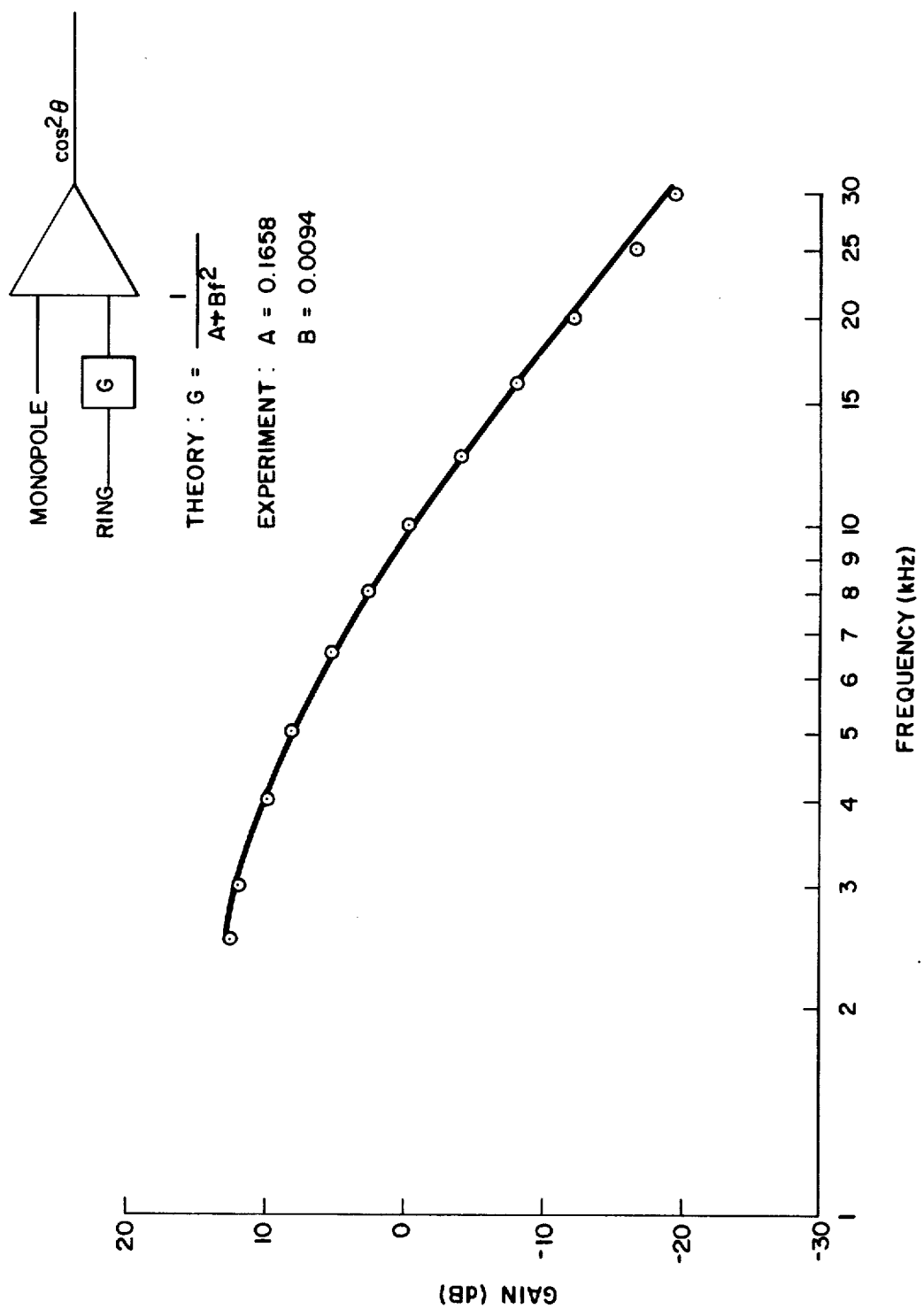
FIG. 5 is a plot of gain vs. frequency for a particular device built in accordance with FIG. 3.

FIG. 5 shows experimentally determined gains for this circuit and the same R/M combination over the 2.5 to 30 kHz range. The curve shows a drop in gain of approximately 33 dB over this band. The constants A and B for the R/M combination were $A = 0.1658$ and $B = 0.0094$. It is evident that the ensemble (the R/M combination transducer and the circuit) is a directional hydrophone which operates over a narrow band of frequencies selectable by adjusting the gain G.

The constants A and B in equation (1) may be obtained by placing a sound source of frequency f in the water in the vicinity of the hydrophone and circuit shown in FIG. 3. The gain G is adjusted until the output of the combination ring and monopole hydrophone shows a ($\cos^2 \theta$) directivity pattern. The gain G and corresponding frequency f are recorded. A different frequency is selected and the process is repeated. A table of frequencies and corresponding gains is constructed. A and B are determined by minimizing the percentage deviation of the curve $G = 1/(A + Bf^2)$ from the data by the process called the method of least squares. This is a well-known mathematical procedure and is described in many mathematical and statistical textbooks, as for example, Scarborough, J. B., Numerical Mathematical Analysis, John Hopkins Press, Baltimore, Md., 1930, 1966. The solid line in FIG. 4 shows the curve $G=1/(A+Bf^2)$ with A and B determined in the above-described manner.

The mathematics of FIG. 3 is shown below in general terms. The ring transducer output can be written as $(A+Bf^2 \sin^2 \theta)$, with $\theta$ being the only variable. The output of the variable-gain amplifier is then $$(A + Bf^2 \sin^2\theta)G =$$
$$(A + Bf^2 \sin^2\theta)\frac{1}{A + Bf^2} =$$
$$\frac{A}{A + Bf^2} + \frac{Bf^2}{A + Bf^2} \sin^2\theta =$$
$$M + N\sin^2\theta$$

If the differential amplifier is weighted so that the output C, of the monopole transducer is $$C = M + N$$

that is, weight is a multiplying factor equal to $(M+N)/C$, the difference between the input signals to the differential amplifier (its output signal) will be $$C - (M + N \sin^2\theta) =$$
$$M + N - M - N\sin^2\theta =$$
$$N - N\sin^2\theta =$$
$$N(1 - \sin^2\theta) =$$
$$N \cos^2\theta$$

This is the ($\cos^2 \theta$) directivity pattern which is desired.

The hydrophone and circuit combination (ensemble) of FIG. 3 forms a low-frequency, directional ring hydrophone over a narrow band of frequencies.

Figure 6:
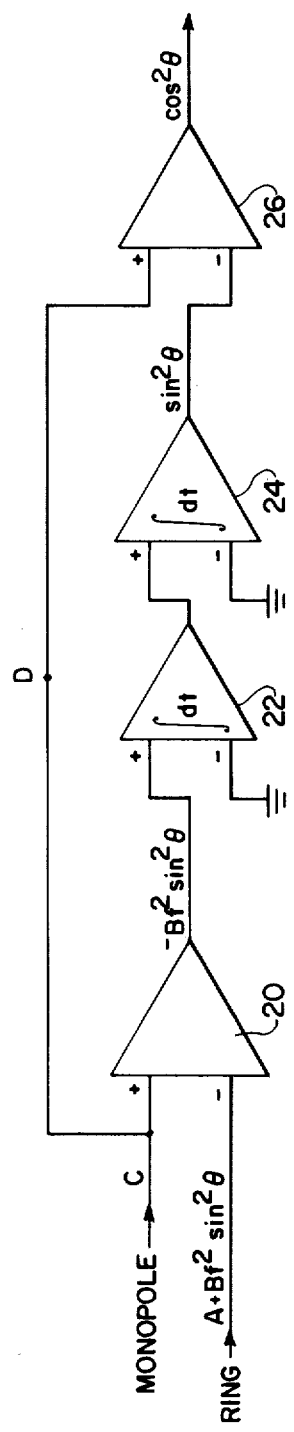
FIG. 6 is a block diagram of a circuit for use with the ring/monopole transducer to provide broadband operation of the ensemble.

To obtain a broadband ensemble with a range of about a decade, a circuit such as that shown in FIG. 6 can be used. This circuit also has an additional advantage—the resultant acoustic sensitivity of the ensemble is constant over the entire frequency range. The magnitude of the output of the ring element 11 is $(A+Bf^2 \sin^2 \theta)$ and this signal is fed to a differential amplifier 20 as one of its inputs, the second input being the output of the monopole 13 whose magnitude is C. The two input signals are subtracted with proper weighting to provide the signal $(-Bf^2 \sin^2 \theta)$ as an output. This signal is integrated twice (in integrators 22 and 24) with respect to time (a time-dependence of $e^{j\omega t}$, where $\omega = 2\pi f$, is assumed) to remove the frequency-squared term. The output of the second integrator 22 has only a ($\sin^2 \theta$) term and this is subtracted from the monopole output in a properly weighted differential amplifier 26 to obtain a ($\cos^2 \theta$) output signal (amplifier 26 is weighted by dividing monopole input by factor C to obtain input of magnitude 1; then $(1 - \sin^2 \theta = \cos^2 \theta)$.

It should be noted that all signals, both input and output, shown on FIGS. 3 and 6 are the magnitudes of time-dependent signals, that is, the magnitudes should be multiplied by the factor $e^{j\omega t}$. This factor has been omitted for the sake of simplicity.

The mathematics associated with FIG. 6 is shown below in general terms. Let the weight of first differential amplifier 20 be A/C so that signal C is converted to a value A. Thus, $$C(\frac{A}{C}) - (A + Bf^2 \sin^2\theta) =$$
$$A - A - Bf^2\sin^2\theta =$$
$$-Bf^2\sin^2\theta$$

This is the magnitude of output of the first differential amplifier. Integrating once and remembering that the total signal is really a time-dependent signal, $$\int (-Bf^2\sin^2\theta)e^{j\omega t} dt =$$
$$\frac{-Bf^2\sin^2\theta}{j\omega} e^{j\omega t}$$

Integrating again, $$\int \frac{-Bf^2\sin^2\theta}{j\omega} e^{j\omega t} dt =$$
$$\frac{-Bf^2\sin^2\theta}{(j\omega)^2} e^{j\omega t} = \frac{-Bf^2\sin^2\theta}{-\omega^2} e^{j\omega t} =$$
$$\frac{Bf^2\sin^2\theta}{-4\pi^2 f^2} e^{j\omega t} = K \sin^2\theta \, e^{j\omega t}$$

and dropping the $e^{j\omega t}$ terms as before, the result is a ($\sin^2 \theta$) output.

Now if the monopole input, C, to the differential amplifier 26 is weighted by a factor (K/C), the result is, $$C(K/C) = K \sin^2\theta =$$
$$K - K \sin^2\theta =$$
$$K(1 - \sin^2\theta) =$$
$$K \cos^2\theta$$

Figure 7:
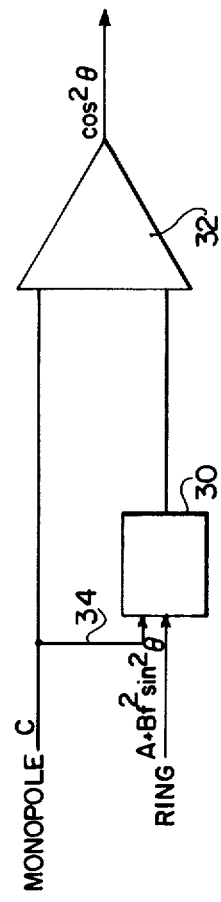
FIG. 7 is a block diagram of a generic version of the invention.

FIG. 7 shows a generic form of the present invention. The block 30 may be designated a function-conversion means, or circuit, and block 32 is the weighted differential amplifier, the weight used varying according to its input signals. Lead 34 carries a zero input signal in the case of the embodiment shown in FIG. 3. This may be accomplished by any suitable means such as a simple on-off switch located, for example, in the function-conversion means 30.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A hydrophone device providing a ($\cos^2 \theta$) directivity pattern comprising:
   a ring transducer and a monopole transducer located in close proximity to each other with their axes being parallel;
   function-conversion means, to which the outputs of said transducers are fed, for converting its input signals to an output signal proportional to ($\sin^2 \theta$);
   weighted subtraction means, to which is fed the output signals of said monopole transducer and said function-conversion means, for weighting at least one of the input signals and then subtracting them to provide a ($\cos^2 \theta$) output signal.

2. A device as in claim 1, wherein said monopole transducer is coaxial with and located within said ring transducer.

3. A device as in claim 2, wherein said function-conversion means is a variable-gain amplifier to which zero signal input is fed from the monopole transducer, said amplifier providing an output signal of the type which can be written generally as $(M+N\sin^2\theta)$, where M and N are constants are $\theta$ is the angle from the axis of the ring and monopole transducers.

4. A device as in claim 3, wherein:

the outputs of the monopole and ring transducers can be written in general mathematical terms as $(Ce^{j\omega t})$ and $[(A+Bf^2\sin^2\theta) e^{j\omega t}]$, respectively;

the variable-gain amplifier has a gain $G=1/(A+Bf^2)$; and the weighted subtraction means weights its monopole input signal by a multiplying factor of $(M+N)/C$.

5. A device as in claim 2, wherein said frequency-conversion means comprises:

differential amplifier means to which the output signals of both transducers are fed as inputs;

first integrating means to which the output of said differential amplifier is fed as an input; and second integrating means to which the output of said first integrating means is fed as an input, the outputs of said second integrating means and said monopole transducer being fed to said weighted subtraction means as inputs.

6. A device as in claim 5, wherein:

said differential amplifier means operates to subtract its input signals' magnitudes, C, and $(A+Bf^2\sin^2\theta)$, from each other with proper weighting factor to obtain an output signal magnitude generally expressed as $(-Bf^2\sin^2\theta)$.

7. A device as in claim 6, wherein:

said subtraction means comprises a differential amplifier with a weight of K/C which is applied to the monopole output signal as a multiplying factor.

* * * * *